(12) United States Patent
Gross

(10) Patent No.: US 6,937,622 B2
(45) Date of Patent: Aug. 30, 2005

(54) DETERMINING PHASE JITTER AND PACKET INTER-ARRIVAL JITTER BETWEEN NETWORK END POINTS

(75) Inventor: Gerhard W. Gross, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 883 days.

(21) Appl. No.: 09/948,705

(22) Filed: Sep. 10, 2001

(65) Prior Publication Data

US 2003/0048812 A1 Mar. 13, 2003

(51) Int. Cl.[7] .......................... H04J 3/06; G01R 31/08
(52) U.S. Cl. ...................... 370/516; 370/252
(58) Field of Search .............................. 370/252, 229, 370/516, 231, 394, 519; 709/223

(56) References Cited

U.S. PATENT DOCUMENTS 4,538,259 A * 8/1985 Moore ...................... 370/394
5,652,627 A * 7/1997 Allen ........................ 348/497

* cited by examiner

*Primary Examiner*—Duc Ho
(74) *Attorney, Agent, or Firm*—Pillsbury Winthrop Shaw Pittman LLP

(57) ABSTRACT

An arrangement is provided for measuring jitter between an initiating network end point and a receiving network end point. A plurality of source packets are sent from the initiating network end point with pre-determined source spacing between any two adjacent source packets to the receiving network end point At the receiving network end point, at least some of the source packets are received with a plurality of destination spacing between pairs of adjacent received packets. A jitter estimation mechanism determines the jitter between the two network end points based on the source spacing and the destination spacing.

8 Claims, 10 Drawing Sheets

US 6,937,622 B2

DETERMINING PHASE JITTER AND PACKET INTER-ARRIVAL JITTER BETWEEN NETWORK END POINTS

RESERVATION OF COPYRIGHT

This patent document contains information subject to copyright protection. The copyright owner has no objection to the facsimile reproduction by anyone of the patent document or the patent, as it appears in the U.S. Patent and Trademark Office files or records but otherwise reserves all copyright rights whatsoever.

BACKGROUND

Aspects of the present invention relate to networking. Other aspects of the present invention relate to packet based networking.

In packet based networking, information is sent from a source network end point to a destination network end point in the form of packets. Different packets corresponding to a same piece of information (e.g., an electronic mail) from a source network end point may reach a same destination network end point via different network paths and individual packets may take a varying amount of time to travel between the source and the destination. For instance, two packets may be sent from a source separated by 3.5 milliseconds and may arrive at a destination separated by 9 milliseconds. Various factors in networks may affect packet-traveling time. For example, temporary network congestion may lead to delay.

The variance in packet latencies is called jitter. The jitter along a network path may have a significant impact on how the network path should be utilized and by what types of applications. For example, a network path with an excessive amount of jitter is not suitable for real-time applications such as Voice over Internet Protocol (VoIP). A reliable method to estimate jitter can be useful for optimizing the performance of different network applications and for network management.

A typical method to measure jitter is shown in FIG. 1, in which an initiating (source) network end point 110 sends a plurality of source packets 115 to a receiving (destination) network end point 130. Using this method, each individual source packet at the source network end point 110 is marked with a sequence number and a departure time stamp. The corresponding sequence number and arrival time of such packets are recorded at the destination. The latency of each packet can them be computed by subtracting the departure time stamp of the packet from the corresponding arrival time stamp. Jitter can then be calculated based on the variance among all the latencies between adjacent packets. For example, a mean and a standard deviation of a series of latency differences may be computed as a measure of jitter.

Measuring jitter according to such method consumes resources at both the source and the destination network end points. For example, each packet needs to be marked with a sequence number and time stamped prior to being sent out. At the destination, each arriving packet has to be examined for its sequence number and the corresponding arrival time stamp needs to be recorded for subtraction purposes.

BRIEF DESCRIPTION OF THE DRAWINGS

The present invention is further described in terms of exemplary embodiments, which will be described in detail with reference to the drawings. These embodiments are non-limiting exemplary embodiments, in which like reference numerals represent similar parts throughout the several views of the drawings, and wherein.

DETAILED DESCRIPTION

The invention is described below, with reference to detailed illustrative embodiments. It will be apparent that the invention can be embodied in a wide variety of forms, some of which may be quite different from those of the disclosed embodiments. Consequently, the specific structural and functional details disclosed herein are merely representative and do not limit the scope of the invention.

The processing described below may be performed by a properly programmed general-purpose computer alone or in connection with a special purpose computer. Such processing may be performed by a single platform or by a distributed processing platform. In addition, such processing and functionality can be implemented in the form of special purpose hardware or in the form of software being run by a general-purpose computer. Any data handled in such processing or created as a result of such processing can be stored in any memory as is conventional in the art. By way of example, such data may be stored in a temporary memory, such as in the RAM of a given computer system or subsystem. In addition, or in the alternative, such data may be stored in longer-term storage devices, for example, magnetic disks, rewritable optical disks, and so on. For purposes of the disclosure herein, a computer-readable media may comprise any form of data storage mechanism, including such existing memory technologies as well as hardware or circuit representations of such structures and of such data.

Figure 1:
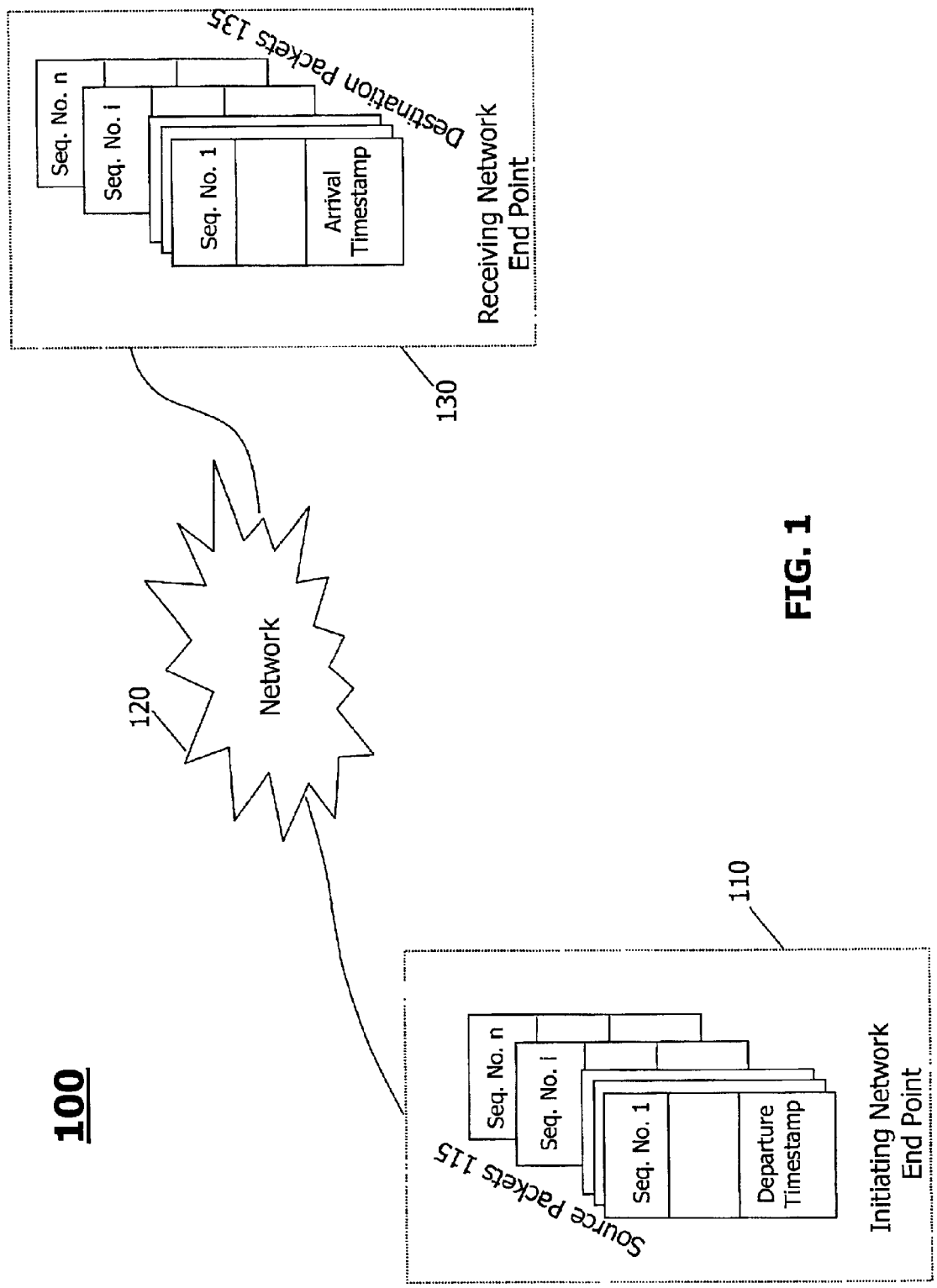
FIG. 1 illustrates a mechanism which measures network jitter between two network end points based on packet sequence numbers and marked time stamps at each location.
Figure 2:
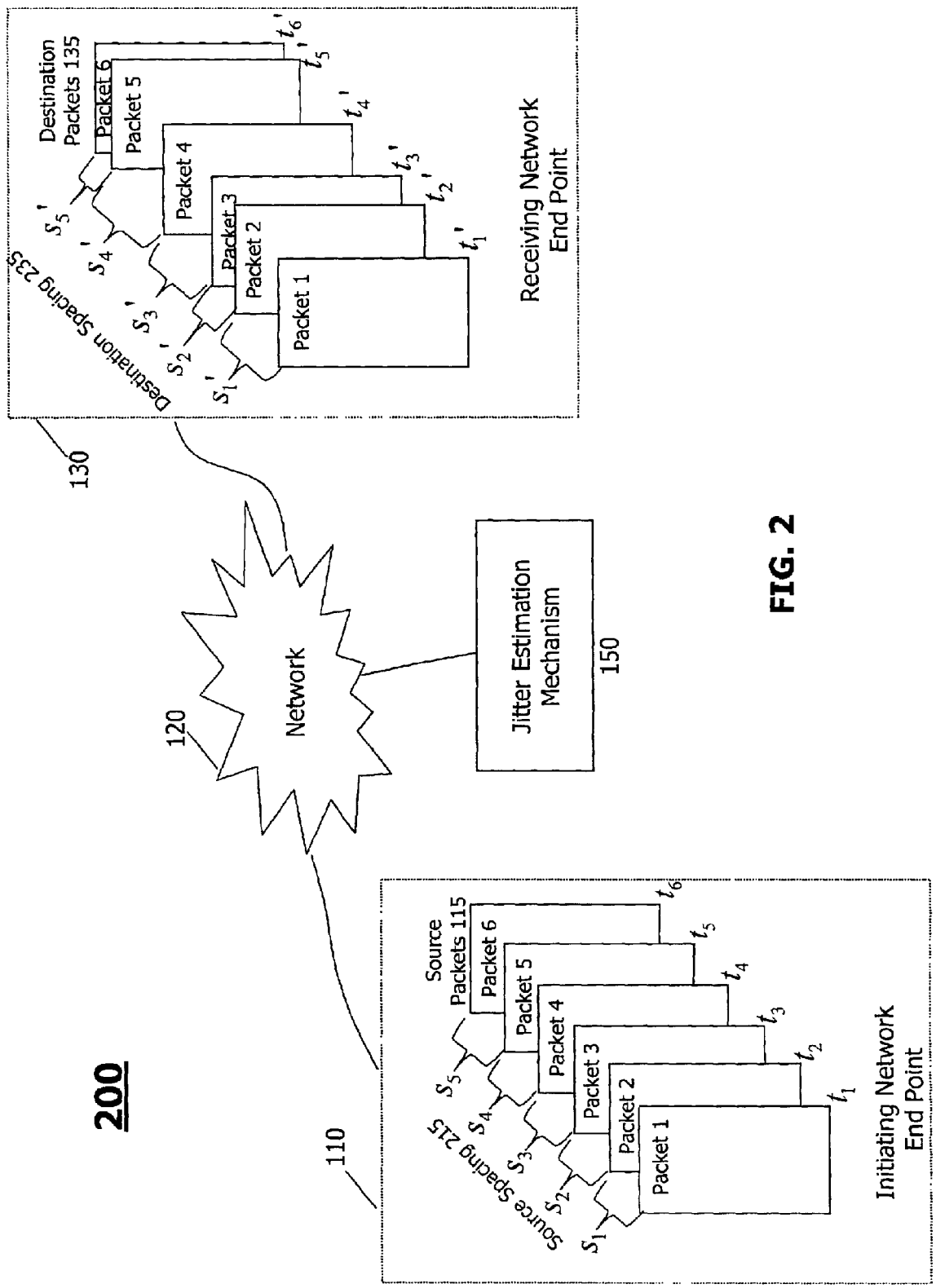
FIG. 2 depicts a configuration of a mechanism to measure network jitter along a path between an initiating network end point and a receiving network end point according to an embodiment of the present invention.

FIG. 2 depicts a first configuration 200 of a mechanism to measure network jitter between an initiating network end point 110 and a receiving network end point 130 based on adjacent packet spacing at the source and destination according to an embodiment of the present invention. The initiating network end point 110 and the receiving network end point 130 are connected through a generic network 120, which may correspond to, for example, the Internet or a proprietary network. In configuration 200, a jitter estimation mechanism 150 is connected to both the initiating network end point 110 and the receiving network end point 130 via the network 120. With the configuration 200, the initiating network end point 110 sends source packets 115 with source spacing 215 to the receiving network end point 130. The jitter estimation mechanism 150 estimates the jitter between the initiating network end point 110 and the receiving network end point 130 based on statistics related to the source spacing 215 and destination spacing 235.

Both the initiating network end point 110 and the receiving network end point 130 in configuration 200 represent a generic network device, which is capable of sending and receiving packets over the network 120. A network end point may correspond to, for example, a server, a client, or an appliance. For illustrative purposes, the initiating network end point 110 is employed, in configuration 200, to send a plurality of packets to the receiving network end point 130 through the network 120 and the receiving network end point 130 is used as a receiving end to intercept the packets.

The initiating network end point 110 sends source packets 115 to the receiving network end point 130. At the receiving end, the receiving network end point 130 receives destination packets 135. Due to possible packet loss, the number of the destination packets 135 may not equal to the number of the source packets 115. In the exemplary configuration 200, the source packets 115 are sent with a pre-determined source spacing 215 between adjacent source packets. Such source spacing is denoted by $S_i, 1 \leq i \leq N-1$, where N is the total number of packets sent by the initiating network end point 110. In the exemplary scheme 200, N=6. Each source spacing $S_i$ can be determined as $t_{i+1} - t_i$, where $t_{i+1}$ is the time the (i+1)th packet is sent and $t_i$ is the time the ith packet is sent.

At the receiving end, the receiving network end point 130 receives a plurality of destination packets 135 with destination spacing 235, $S'_j, 1 \leq j \leq N'-1$ between the jth received packet and the (j+1)th received packet, where N' is the total number of received packets. Each destination spacing $S_j$ can be determined as $t'_{j+1} - t'_j$, where $t'_{j+1}$ is the time the (j+1)th packet is received and $t'_j$ is the time the jth packet is received. Due to possible packet loss, the N' may not be the same as N. In addition, due to the fact that network packets generally do not have identical traveling time, the spacing between two adjacent packets may be different at the receiving end. For example, although adjacent packets, packet 2 and packet 3 may be sent out from the initiating network end point 110 with some inter-packet spacing $S_2$, when they are received at the receiving network end point 130, the destination spacing $S'_2$ may have a different value than $S_2$.

According to the embodiments of the present invention, the difference between the source spacing 215 and the destination spacing 235 is utilized to estimate network jitter between the initiating network end point 110 and the receiving network end point 130. In the configuration 200, the jitter estimation mechanism 150 resides outside of both the initiating network end point 110 and the receiving network end point 130 yet connects to both via the network 120. With the configuration 200, the jitter estimation mechanism 150 may base its estimation of jitter using statistics gathered by and sent from the initiating network end point 110 and the receiving network end point 130.

The jitter estimation mechanism 150 takes statistics sent from both the initiating network end point 110 and the receiving network end point 130 and estimates the network jitter between the two end points. The statistics may be relevant to network jitter and are computed by both end points based on the spacing of either the source packets 215 or the destination spacing 235.

Figure 3:
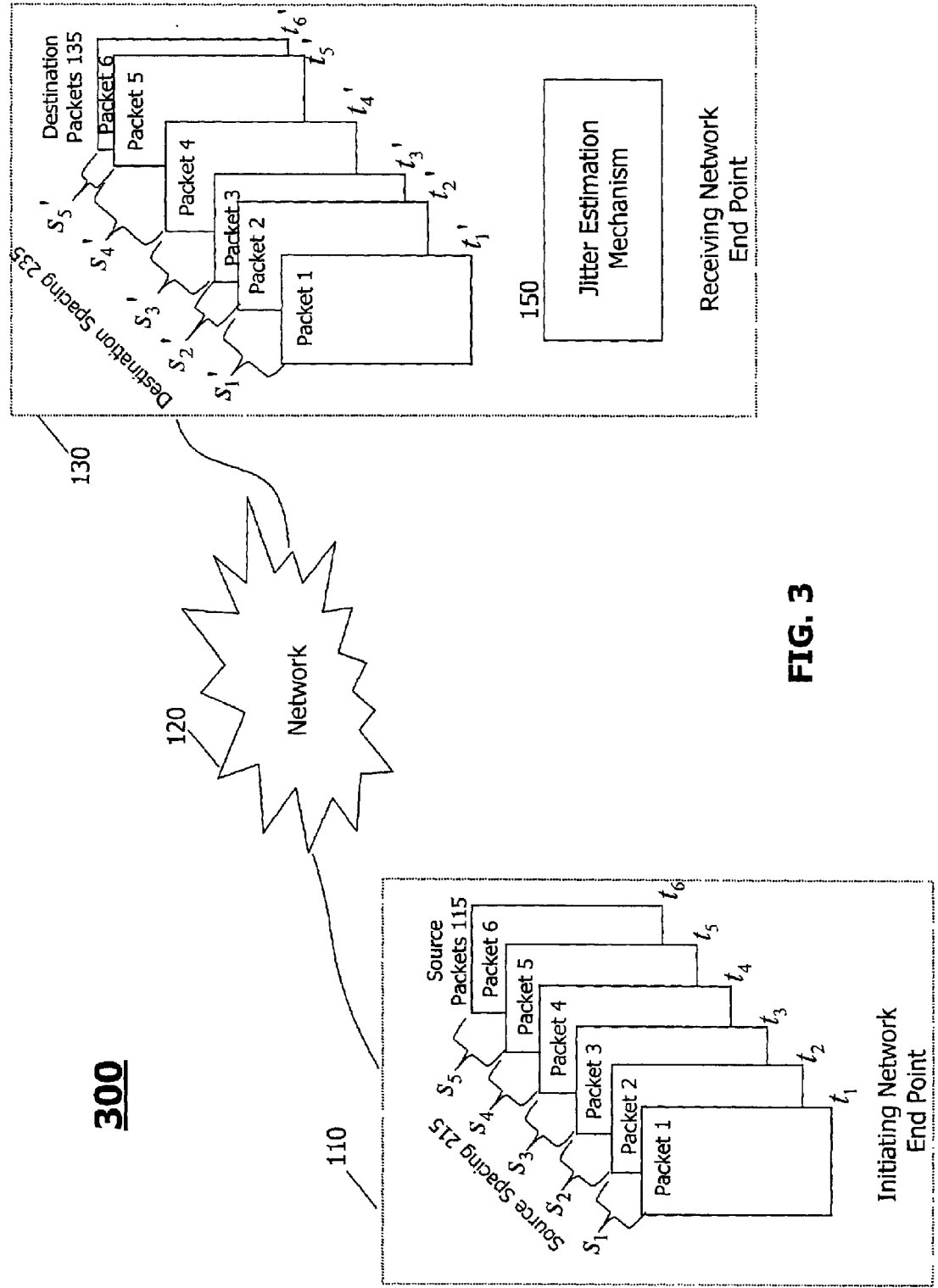
FIG. 3 depicts a configuration of a mechanism to measure network jitter along a path between an initiating network end point and a receiving network end point according to a different embodiment of the present invention.

The jitter estimation mechanism 150 may also be configured differently. For example, it may be installed within the receiving network end point 130. FIG. 3 depicts a configuration 300 of a mechanism to measure the jitter between the initiating network end point 110 and the receiving network end point 130 based on the source spacing 215 and the destination spacing 235 of adjacent packets, according to a different embodiment of the present invention. In the configuration 300, the jitter estimation mechanism 150 resides within the receiving network end point 130 and estimates the jitter based on the statistics related to the destination spacing 235, gathered at the receiving network end point 130, and the source spacing 215, sent from the initiating network end point 110 via the network 120.

Figure 4:
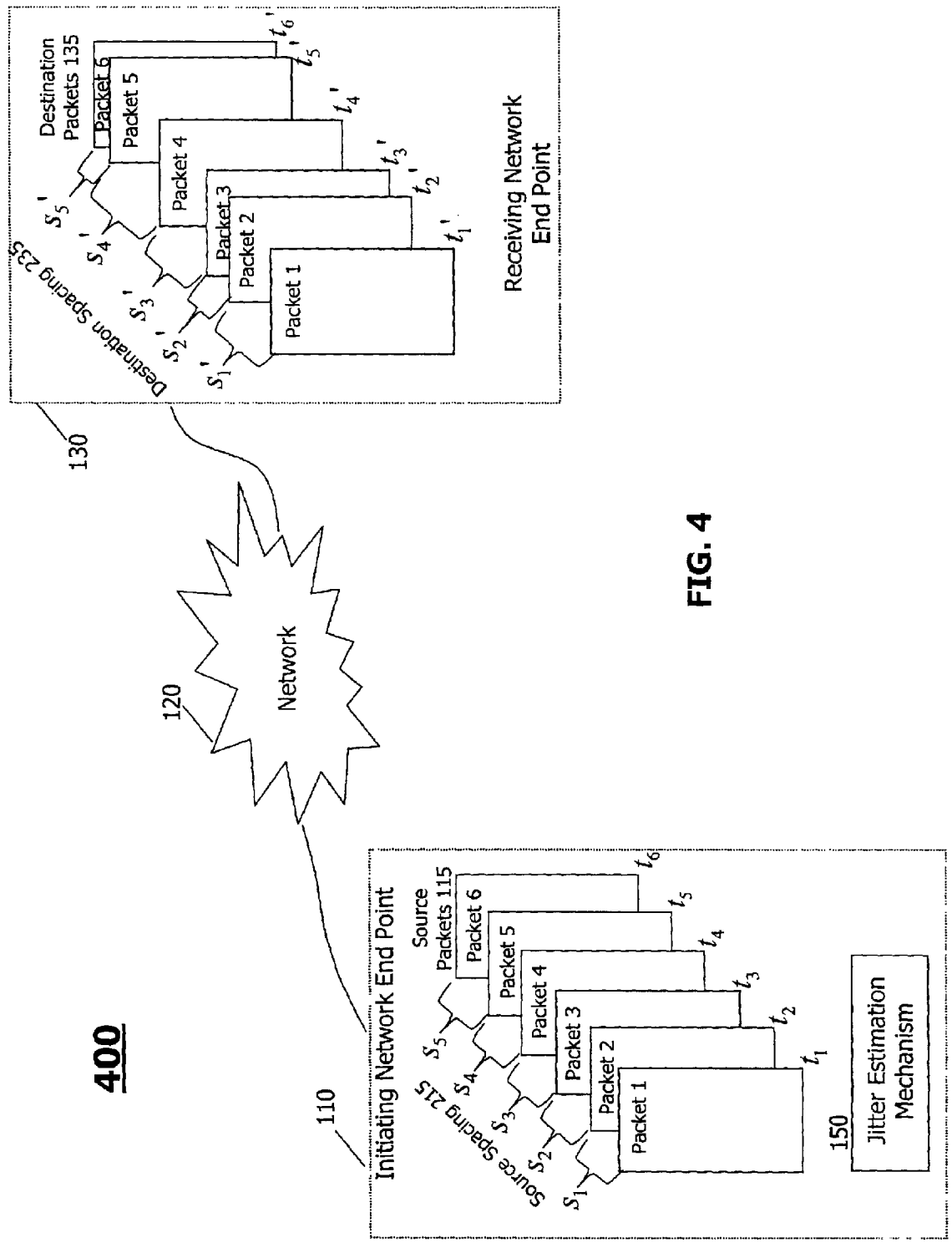
FIG. 4 depicts a configuration of a mechanism to measure network jitter along a path between an initiating network end point and a receiving network end point according to yet another different embodiment of the present invention.

The jitter estimation mechanism 150 may also be configured to reside within the initiating network end point 110. FIG. 4 depicts a configuration 400 of a mechanism to measure the jitter between the initiating network end point 110 and the receiving network end point 130 based on the source spacing 215 and the destination spacing 235 between adjacent packets, according to yet another different embodiment of the present invention. In the configuration 400, the jitter estimation mechanism 150 estimates the jitter based on the statistics related to the source spacing 215, gathered at the initiating network end point 110, and the destination spacing 235, sent from the receiving network end point 130 via the network 120.

Figure 5:
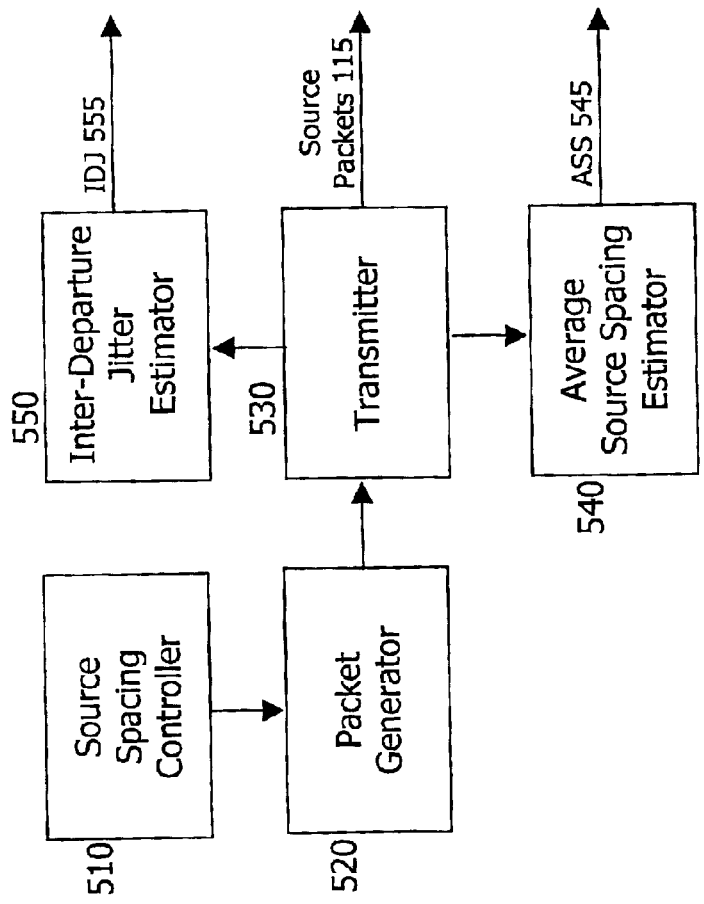
FIG. 5 depicts the high level functional block diagram of an initiating network end point.

FIG. 5 depicts the high level functional block diagram of the initiating network end point 110, which comprises a source spacing controller 510, a packet generator 520, a transmitter 530, an average source spacing estimator 540, and an inter-departure jitter estimator 550. At the initiating network end point 110, the packet generator 520 generates a plurality of source packets 115, which are sent, by the transmitter 530, as the source packets to the receiving network end point 130 via the network 120.

The packet generator 520 may generate source packets according to some pre-determined packet spacing 215, controlled by the source spacing controller 510. For example, the source spacing controller 510 may administers the packet generator 520 to produce evenly spaced packets. That is, the spacing between any two adjacent source packets is constant or $S_i = c$, $1 \leq i \leq N-1$, where c is a constant. The predetermined packet spacing may also correspond to other types of unequal source spacing schemes. For example, an unequal packet spacing scheme may define $S_i = c_1$, for i=odd number, and $S_i = c_2$, for i=even number, where $c_1 \neq c_2$. In general, packet spacing may be defined using a profile that describes the spacing scheme. The source spacing controller

510 may base its control over the generation of source packets using such a profile.

The transmitter 530 sends the source packets 115, generated according to a pre-determined packet spacing, to the receiving network end point 130. Ideally, the transmitter 530 sends the source packets 115 with the spacing identical to the spacing according to which the packets are generated. Due to different reasons (e.g., the transmitting port at the initiating network end point may be temporarily congested), the source packets may be sent out with a source spacing profile different from what is intended. For example, if the pre-determined packet spacing corresponds to even spacing, the source packets may be actually sent out with a spacing that is not exactly even. That is, the source spacing 215 is not identical to the pre-determined spacing administered by the source spacing controller 510. In this case, the actual (non-even) source spacing 215 corresponds to an inter-departure jitter at the initiating network end point 110.

The inter-departure jitter estimator 550 estimates the inter-departure jitter (or IDJ 555) based on the actual source spacing 215 between adjacent source packets. In the exemplary embodiment illustrated in FIG. 5, the inter-departure jitter estimator 550 may record the actual packets transmitting time and derive the actual source spacing 215 between every two adjacent source packets. The IDJ 555 may be defined as the standard deviation of such recorded actual source spacing and may be computed as below:

$$IDJ = \sqrt{\frac{(N-1) \times \sum_{i=1}^{i=N-1} S_i^2 - \left(\sum_{i=1}^{i=N-1} S_i\right)^2}{(N-1)^2}}$$

The estimated IDJ 555 may be used for different purposes. For example, it may be used to evaluate the uncertainty of a jitter measure which considers the impact of the source jitter.

The average source spacing estimator 540 measures the average source spacing (or ASS 545) of the source packets at the initiating network end point 110. Together with the IDJ 555, the ASS 545 offers a statistical characterization of the source spacing 215. Both the IDL 555 and the ASS 545, once computed, are sent to the jitter estimation mechanism 150 and maybe further used in estimating the jitter between two network end points. If the jitter estimation mechanism 150 is located outside of the initiating network end point 110 (either stand-alone or is located in the receiving network end point 130), the statistics ASS 545 and IDJ 555 are transmitted to the jitter estimation mechanism 150 via the network 120.

Figure 6:
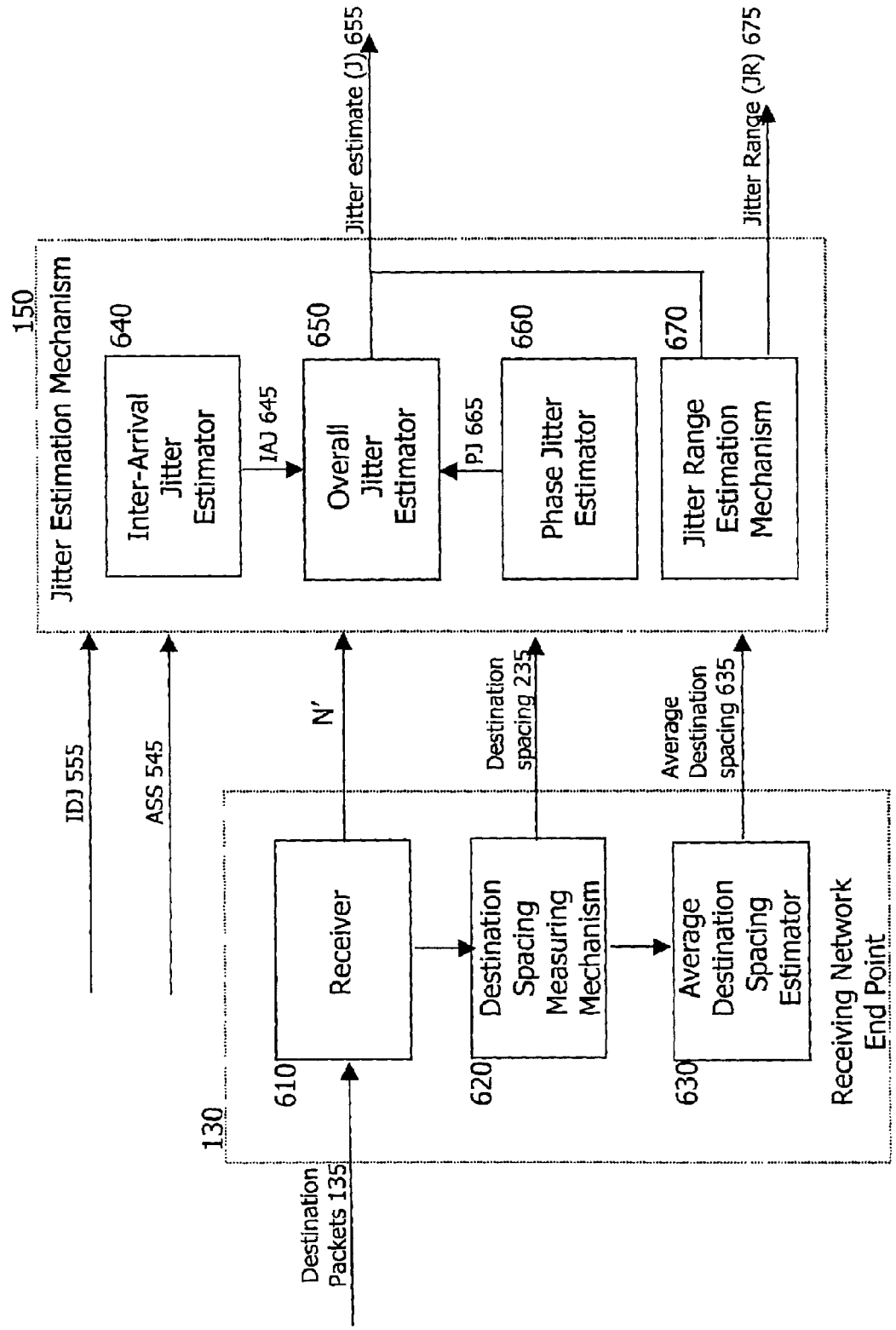
FIG. 6 depicts the high level internal structures of both a receiving network end point and a jitter estimation mechanism and how they interact with each other.

FIG. 6 depicts the high level internal structures of both the receiving network end point 130 and the jitter estimation mechanism 150, how they interact with each other, and how they are related to the initiating network end point 110, according to embodiments of the present invention. The receiving network end point 130 includes a receiver 610, a destination spacing measuring mechanism 620, and an average destination spacing estimator 630. The receiver 610 receives the destination packets 135 sent from the initiating network end point 110 through the network 120. The number of destination packets 135 may not be equal to the number of source packets 115. The actual number of destination packets or N', counted at the receiving network end point 130 is sent to the jitter estimation mechanism 150 and may be used in evaluating the jitter between the initiating network end point 110 and the receiving network end point 130.

At the receiving end, the destination packet spacing 235 is measured by the destination spacing measuring mechanism 620. The arriving time of each destination packet may be recorded and the elapsed time between two adjacent destination packets is the destination spacing of the two packets. Due to network jitter, the source spacing between two source packets is usually not equal to the corresponding destination spacing at the receiving end. The difference may be caused by network jitter along the path. Therefore, the destination spacing is used, according to embodiments of the present invention, in estimating the jitter. In FIG. 6, the measured destination spacing 235 is sent to the jitter estimation mechanism 150.

In addition to the destination spacing 235, the average destination spacing estimator 630 computes the average destination spacing 635 (or ADS 635) based on the measured destination spacing 235. Such estimated ADS 635 is also sent to the jitter estimation mechanism 150 and used to estimate the jitter between the initiating network end pint 110 and the receiving network end point 130.

According to the exemplary embodiments of the present invention illustrated in FIG. 6, the jitter estimation mechanism 150 comprises an inter-arrival jitter estimator 640, a phase jitter estimator 660, an overall jitter estimator 650, and a jitter range estimation mechanism 670. The jitter estimation mechanism 150 receives the N, the ASS 545, and the IDJ 555, sent from the initiating network end point 110 as well as the N', the destination spacing 235, and the ADS 635 from the receiving network end point 130, as input and computes a jitter estimate 655 and a jitter estimate range JR 675. The jitter estimate 655 describes the overall jitter between the two network end points and the JR 675 describes the range of the true jitter, which reflects the certainty of the estimated jitter estimate 655.

The inter-arrival jitter estimator 640 computes the inter-arrival jitter or IAJ 645 based on the destination spacing 235 of the received packets. For example, the IAJ 645 may be defined as the standard deviation of the destination spacing between adjacent destination packets. In this case, the IAJ 645 may be computed as:

$$IAJ = \sqrt{\frac{(N'-1) \times \sum_{j=1}^{j=N'-1} S_j^2 - \left(\sum_{j=1}^{j=N'-1} S_j\right)^2}{(N'-1)^2}}.$$

The phase jitter estimator 660 computes the phase jitter or PJ 665 between the initiating network end point 110 and the receiving network end point 130. According to an embodiment of the present invention, phase jitter may be defined as the difference between the average destination spacing ADS 635 and the average source spacing ASS 545 or:

$PJ = ADS - ASS.$

Although the IAJ 645 and the PJ 665 may measure different aspects of network jitter along a path, both may be used alone as indicators of the jitter between the initiating network end point 110 and the receiving network end point 130. They may also be combined to compute a compound jitter that may characterize jitter from different aspects. The overall jitter estimator 650 may compute an overall jitter estimate 655 based on both PJ 665 and IAJ 645. For example, the overall jitter 655 may be simply defined as the summation of the PJ 665 and the IAJ 645. That is, overall jitter=PJ+IAJ.

An estimate of network jitter may be computed based on certain assumptions. For example, the source spacing profile may be assumed to be known and no significant packet loss may also be assumed between the initiating network end point 110 and the receiving network end point 130. As discussed earlier, when even source spacing is employed, the IDJ 555 (inter-departure jitter) at the source is ideally zero and the ASS 545 (average source spacing) is ideally equal to the value of the predetermined even spacing. In such an ideal situation, the jitter 655 corresponds to a true characterization of the deviation, at the receiving end, from the ideal conditions.

Deviation occurred at the destination may be considered with respect to actual conditions instead of with respect to ideal conditions. For example, if intended source spacing is even spacing and the actual source spacing, when the packets are transmitted, do not correspond to even spacing, the destination spacing may be significantly different from the intended source spacing (ideal situation) but it may be less different from the actual source spacing. In this case, the actual jitter of the network path may differ from what is computed based on pre-defined formulae.

There may be different factors that may potentially affect the certainty of the jitter estimate 655. For example, deviation of actual source spacing from intended source spacing may increase the uncertainty of the final estimate of the network jitter 655. If the intended source spacing is even spacing, which corresponds to a zero inter-departure jitter, a larger IDJ 555 measured at the initiating network end point 110 indicates that the intended source spacing is not realized. In this case, the overall jitter, estimated by the overall jitter estimator 650, may not be adequately precise in terms of characterizing the jitter introduced by the network path because part of the jitter, such as what is characterized by the IDJ 555, may be due to the source jitter instead of the jitter from the network path.

A different factor may relate to packet loss. If significant number of packets are lost (i.e., N>>N'), IAJ 645 and PJ 665 may not represent the precise inter-arrival jitter of adjacent destination packets and the average destination spacing. For example, even if both ADS 635 and the IAJ 645 are large, the network jitter may not be the direct or the only cause. As a consequence, the final estimate for the overall jitter between two network end points may not reflect the true degree of jitter along the network path.

The jitter range estimation mechanism 670 computes the lower bound and the upper bound (or range) of the estimated overall jitter 655. The range may be computed in such a way that it characterizes the uncertainty in estimated jitter 655. The larger the range is, the more uncertain the estimated jitter 655 is. The bounds may be estimated according to information such as N' and IDJ 555. The range may serve as an indicator in terms of how the corresponding actual jitter may fluctuate around the estimated jitter. For example, the range of the estimated overall jitter 655 may be defined as, JB=PJ+IAJ±IDJ. With this example range JB, when IDJ 555 is close to zero (ideal condition when even source spacing is adopted), the true jitter is close to the estimated overall jitter 655. When the actual source spacing is not even (i.e., IDJ>0), the range is larger which indicates that the corresponding true jitter may fluctuate more. In general, the JR 675 may be expressed as the estimated jitter with its lower bound and upper bound. For example, $J \geq 0$, $J \in [J-IDJ, J+IDJ]$.

Figure 7:
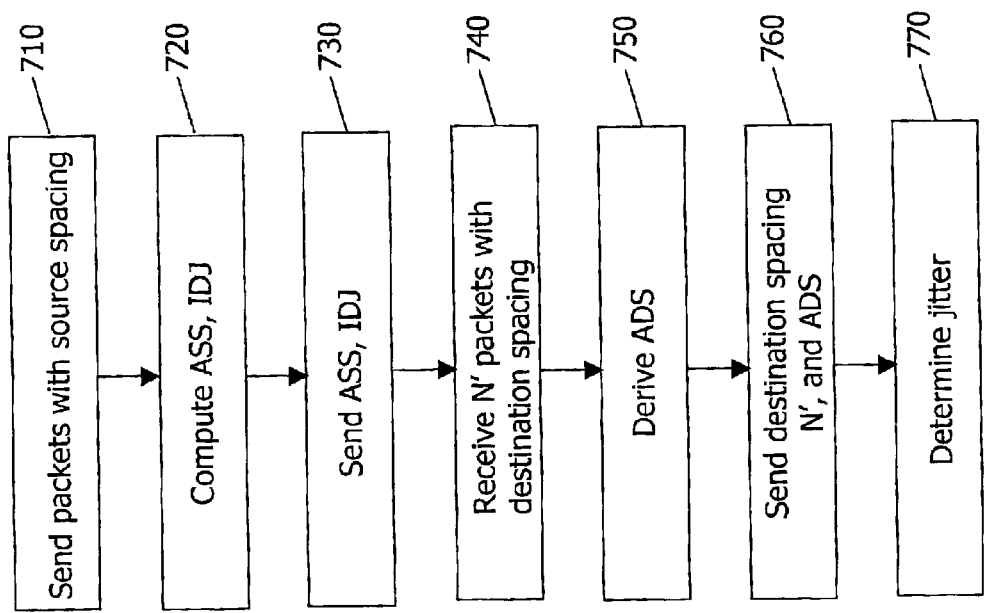
FIG. 7 is an exemplary flowchart of a process, in which the jitter between an initiating network end point and a receiving network end point is measured based on the source spacing and the destination spacing between adjacent packets, according to embodiments of the present invention.

FIG. 7 is an exemplary flowchart of a process, in which the jitter between the initiating network end point 110 and the receiving network end point 130 is measured based on the source spacing and destination spacing, according to embodiments of the present invention. Source packets 115 are first sent, at act 710, from the initiating network end point 110 to the receiving network end point 130 via the network 120. The source packets are sent with the source spacing 215. The ASS 545 and IDJ 555 are then computed, at act 720, at the initiating network point 110 and sent, at act 730, to the jitter estimation mechanism 150. N (the number of source packets) is also sent with the other information to the jitter estimation mechanism 150.

In FIG. 7, at the receiving network end point 130, a plurality of N' packets are received at act 740 with destination spacing 235 between pairs of adjacent destination packets. Based on the destination spacing, the ADS 635 is computed at act 750 and sent, at act 760, together with the destination spacing 235 and N', to the jitter estimation mechanism 150. Based on the statistics sent from both the initiating network end point 110 and the receiving network end point 130, the jitter estimation mechanism 150 determines, at act 770, the jitter between the two network end points.

Figure 8:
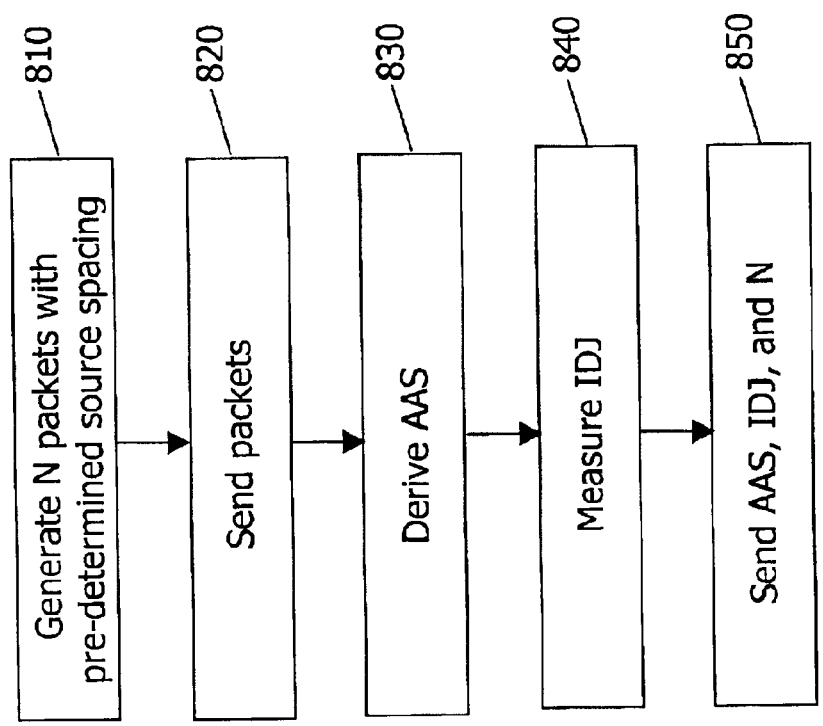
FIG. 8 is an exemplary flowchart of a process, in which an initiating network end point sends packets with pre-determined source spacing as well as related information for estimating network jitter according to embodiments of the present invention.

FIG. 8 is an exemplary flowchart of a process, in which the initiating network end point 110 participates in evaluating network jitter by sending source packets with predetermined source spacing and statistics computed based on source packets, according to embodiments of the present invention. Source packets 115 with pre-determined source spacing are generated at act 810 and sent to the receiving network end point at act 820. The actual source spacing 215 is measured, based on which statistics ASS 545 and IDJ 555 are computed at acts 830 and 840. Such derived statistics characterize the actual transmission condition at the initiating point. They are then sent, at act 850, to the jitter estimation mechanism 150.

Figure 9:
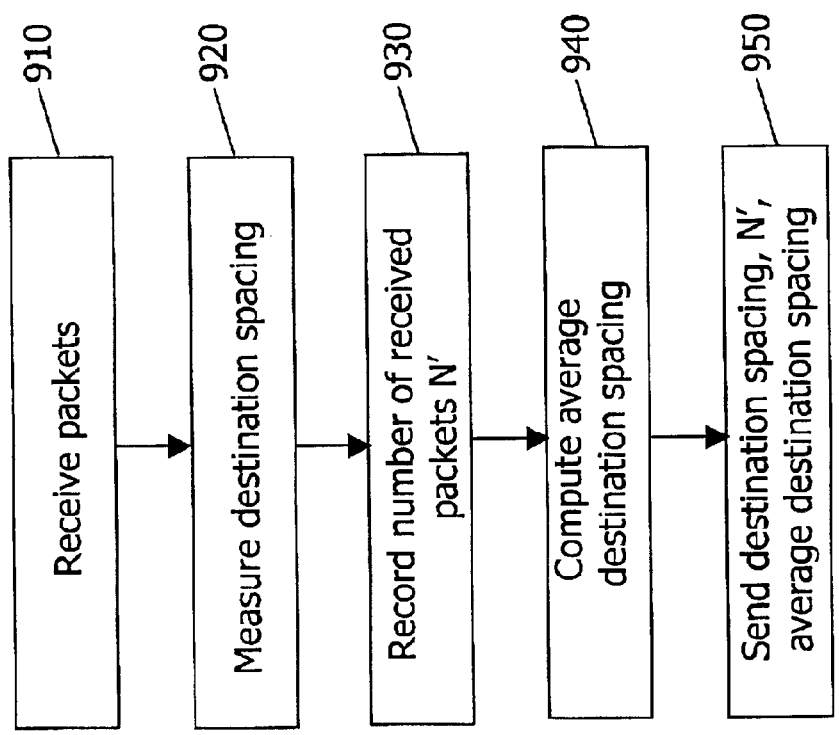
FIG. 9 is an exemplary flowchart of a process, in which a receiving network end point receives packets with destination spacing and computes relevant information for estimating network jitter according to embodiments of the present invention.

FIG. 9 is an exemplary flowchart of a process, in which the receiving network end point 130 receives a plurality of N' destination packets with destination spacing and computes statistics that are relevant to the path jitter, according to embodiments of the present invention. The destination packets are received at act 910. The destination spacing between adjacent received packets is measured at act 920 and the number of received packets (N') is recorded at act 930. Based on such gathered information, the ADS 635 is calculated at act 940 and sent, together with the destination spacing and N', to the jitter estimation mechanism 150 at act 950.

Figure 10:
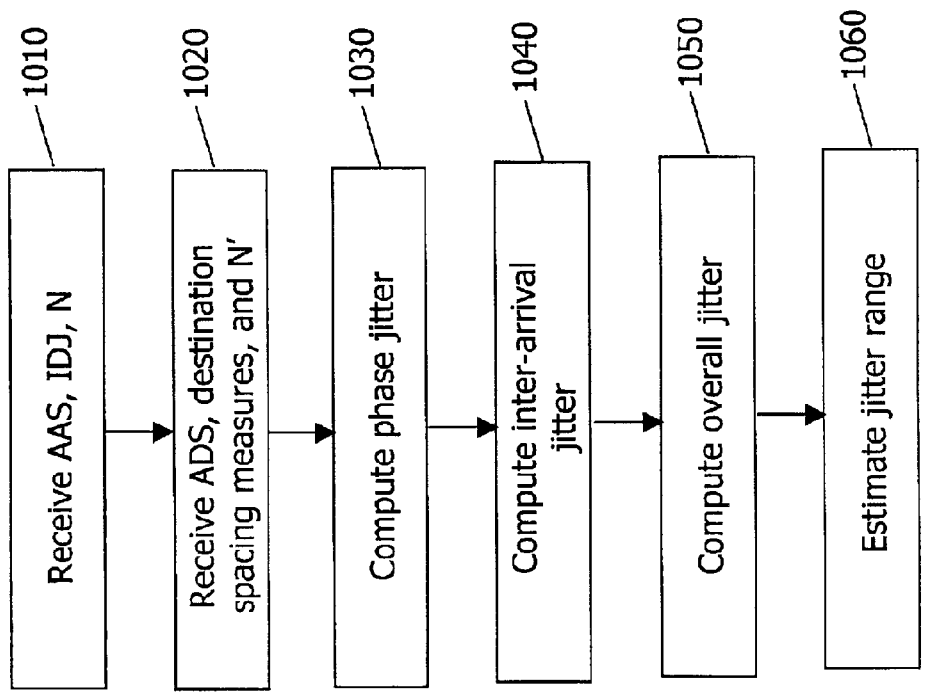
FIG. 10 is an exemplary flowchart of a process, in which a jitter estimation mechanism estimates network jitter along a path between two network end points based on source spacing and destination spacing, according to embodiments of the present invention.

FIG. 10 is an exemplary flowchart of a process, in which the jitter estimation mechanism 150 estimates the jitter between two network end points based on source spacing and destination spacing information, according to embodiments of the present invention. The jitter estimation mechanism 150 receives, at act 1010, information from the initiating network end point 110, including the ASS 545, the IDJ 555, and N. It also receives, at act 1020, relevant information from the receiving network end point 130, including N', the destination spacing 235, and the ADS 635. Based on received information, the jitter estimation mechanism 150 computes the phase jitter PJ 665, at act 1030, the IAJ 645, at act 1040, and the overall jitter J 655 at act 1050. The range of the computed jitter is then estimated, at act 1060, based on relevant statistics.

While the invention has been described with reference to the certain illustrated embodiments, the words that have been used herein are words of description, rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather extends to all equivalent structures, acts, and, materials, such as are within the scope of the appended claims.

What is claimed is:

1. A method for a receiving network end point, comprising:
   - receiving a plurality of packets, sent from an initiating network end point, with a plurality of corresponding destination spacings between pairs of adjacent received packets;
   - deriving an average destination spacing based on the destination spacings;
   - receiving an average actual source spacing and an inter-departure jitter measure, sent from the initiating network end point;
   - sending the plurality of destination spacings and the average destination spacing; and
   - estimating the jitter between the initiating network end point and the receiving network end point based on the average actual source spacing, the inter-departure jitter measure, the destination spacings, and the average destination spacing.

2. A method for estimating jitter, comprising:
   - receiving an average actual source spacing and an inter-departure jitter measure from an initiating network end point;
   - receiving a plurality of destination spacings and an average destination spacing from a receiving network end point; and
   - measuring the jitter between the initiating network end point and the receiving network end point based on the average actual source spacing, the inter-departure jitter measure, the plurality of destination spacings, and the average destination spacing.

3. The method according to claim 2, wherein the measuring the jitter includes:
   - estimating the phase jitter between the initiating network end point and the receiving network end point based on the average actual source spacing and the average destination spacing; or
   - estimating the inter-arrival jitter between the initiating network end point and the receiving network end point based on the plurality of destination spacings.

4. The method according to claim 3, further comprising:
   - estimating the jitter between the initiating network end point and the receiving network end point based on the phase jitter and the inter-arrival jitter.

5. A computer-readable medium encoded with a program in a receiving network end point, the program, when executed, causing:
   - receiving a plurality of packets, sent from an initiating network end point, with a corresponding plurality of destination spacings between pairs of adjacent received packets;
   - deriving an average destination spacing based on the destination spacings;
   - receiving an average actual source spacing and an inter-departure jitter measure, sent from the initiating network end point;
   - sending the plurality of destination spacings and the average destination spacing; and
   - estimating the jitter between the initiating network end point and the receiving network end point based on the average actual source spacing, the inter-departure jitter measure, the destination spacings, and the average destination spacing.

6. A computer-readable medium encoded with a program for estimating jitter, the program, when executed, causing:
   - receiving an average actual source spacing and an inter-departure jitter measure from an initiating network end point;
   - receiving a plurality of destination spacings and an average destination spacing from a receiving network end point; and
   - measuring the jitter between the initiating network end point and the receiving network end point based on the average actual source spacing, the inter-departure jitter measure, the plurality of destination spacings, and the average destination spacing.

7. The medium according to claim 6, wherein the measuring the jitter includes:
   - estimating the phase jitter between the initiating network end point and the receiving network end point based on the average actual source spacing and the average destination spacing; or
   - estimating the packet inter-arrival jitter between the initiating network end point and the receiving network end point based on the plurality of destination spacings.

8. The medium according to claim 7, the program, when executed, further causing:
   - estimating the jitter between the initiating network end point and the receiving network end point based on the phase jitter and the packet inter-arrival jitter.

* * * * *